(12) United States Patent
Joshi et al.

(10) Patent No.: US 11,494,670 B2
(45) Date of Patent: Nov. 8, 2022

(54) UNIFIED MODERATION AND ANALYSIS OF CONTENT

(71) Applicant: Microsoft Technology Licensing, LLC, Redmond, WA (US)

(72) Inventors: Sandeep Prakash Joshi, Bengaluru (IN); Subhajit Datta, Bengaluru (IN); Debashish Ghosh, Bengaluru (IN); Bhavneet Singh Ahuja, Bangalore (IN); Sachin Kakkar, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 16/822,267

(22) Filed: Mar. 18, 2020

(65) Prior Publication Data
US 2021/0295177 A1    Sep. 23, 2021

(51) Int. Cl.
*G06N 5/04*        (2006.01)
*G06Q 50/00*       (2012.01)
*G06N 20/00*       (2019.01)
*G06F 16/9535*     (2019.01)
*H04L 67/306*      (2022.01)
*H04L 67/10*       (2022.01)

(52) U.S. Cl.
CPC ........... *G06N 5/04* (2013.01); *G06F 16/9535* (2019.01); *G06N 20/00* (2019.01); *G06Q 50/01* (2013.01); *H04L 67/306* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 9,128,896 B2* | 9/2015 | Mason | ................... | G06Q 10/00 |
| 9,384,243 B2* | 7/2016 | Li | ........................ | G06F 16/287 |
| 9,432,320 B2* | 8/2016 | Wookey | ................. | H04L 51/52 |
| 9,571,649 B2* | 2/2017 | Sharpe | ............... | H04M 3/5191 |
| 9,614,807 B2* | 4/2017 | Spivack | ............... | H04L 67/306 |
| 9,754,011 B2* | 9/2017 | Skrobotov | .......... | G06F 3/04842 |
| 9,876,751 B2* | 1/2018 | Spivack | ................... | G06N 5/04 |
| 10,102,305 B1* | 10/2018 | Chang | ................... | G06F 16/957 |
| 10,133,789 B2* | 11/2018 | Li | ...................... | G06F 16/24578 |
| 10,135,779 B2* | 11/2018 | Chhaya | ................ | H04L 51/216 |
| 10,163,134 B2* | 12/2018 | Miller | ............... | G06Q 30/0276 |
| 10,776,432 B2* | 9/2020 | Volach | .................. | H04L 67/535 |
| 10,997,257 B2* | 5/2021 | Stoyanov | ............ | G06F 16/9535 |

(Continued)

*Primary Examiner* — Lashonda Jacobs-Burton
(74) *Attorney, Agent, or Firm* — Schwegman Lundberg & Woessner, P.A.

(57) ABSTRACT

The disclosed embodiments provide a system for processing data. During operation, the system identifies content shared within an online system and interactions between users of the online system and the content that match behavioral criteria and content-based criteria in a set of rules. Next, the system aggregates the content and the interactions into trends in the content and the interactions, predictions associated with the content and the interactions, and recommendations for moderating the content and the interactions. The system then outputs representations of the trends, the predictions, and the recommendations in a user interface. Finally, the system receives, via the user interface, an action to be performed on a subset of the content and updates sharing of the content within the online system based on the action.

20 Claims, 7 Drawing Sheets

(56) References Cited

U.S. PATENT DOCUMENTS

| | | | |
|---|---|---|---|
| 11,263,241 B2* | 3/2022 | Rezaeian | G06F 3/048 |
| 11,263,662 B2* | 3/2022 | Hasan | G06Q 50/01 |
| 2013/0046772 A1* | 2/2013 | Gu | G06F 16/435 |
| | | | 707/E17.014 |
| 2013/0185106 A1* | 7/2013 | Donatone | G06Q 50/01 |
| | | | 705/7.14 |
| 2014/0025692 A1* | 1/2014 | Pappas | G06F 16/00 |
| | | | 707/754 |
| 2014/0101247 A1* | 4/2014 | Pappas | H04L 67/535 |
| | | | 709/204 |
| 2014/0337436 A1* | 11/2014 | Hoagland | H04L 51/216 |
| | | | 709/204 |
| 2015/0256636 A1* | 9/2015 | Spivack | G06N 5/04 |
| | | | 709/224 |
| 2015/0370909 A1* | 12/2015 | Volach | G06F 16/24575 |
| | | | 707/722 |
| 2018/0341877 A1* | 11/2018 | Panattoni | G06N 5/025 |
| 2020/0267165 A1* | 8/2020 | Leliwa | H04L 51/02 |
| 2020/0286000 A1* | 9/2020 | Arpat | G06Q 10/10 |
| 2020/0364275 A1* | 11/2020 | Liu | G06Q 50/01 |
| 2021/0026626 A1* | 1/2021 | Jain | G06F 3/0482 |
| 2021/0056376 A1* | 2/2021 | Panayiotou | G06K 19/0723 |
| 2021/0081900 A1* | 3/2021 | Wang | G06N 5/04 |
| 2021/0089602 A1* | 3/2021 | Basu | H04L 67/306 |
| 2021/0142293 A1* | 5/2021 | Kenthapadi | G06F 16/212 |
| 2021/0374797 A1* | 12/2021 | Hasan | G06Q 50/01 |
| 2021/0406838 A1* | 12/2021 | Ramanath | G06Q 50/01 |
| 2022/0046074 A1* | 2/2022 | Zhong | H04N 21/4788 |

* cited by examiner

Create New Dashboard                                    ✕

Dashboard details

302 { Dashboard name*
      US Politics

From Date*        Date*
      10/12/18          12/10/18
304 ⌡              ⌡ 306
      Content Source*

308 { ☐ LinkedIn articles   ☐ Posts
      ☑ Comments            ☑ 3rd party articles Search query*                                    ⎡ 310

┌─────────────────────────────────────────────────────┐
│ (AND) - All of the following conditions must be met: │
└─────────────────────────────────────────────────────┘

[ contains ▼ ]   [ keywords ▼ ]   [ US elections, econo... ] ✕
         ⌡ 312            ⌡ 314              ⌡ 316
    [ + And ]
         ⌡ 318
    ─── Or is Not ⬤
                  ⌡ 320        [ + Add ]
                                   ⌡ 322

( Save Dashboard )
         ⌡ 324

UNIFIED MODERATION AND ANALYSIS OF CONTENT

BACKGROUND

Field

The disclosed embodiments relate to data analysis. More specifically, the disclosed embodiments relate to techniques for performing unified moderation and analysis of content.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as client-server applications and/or devices that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals use an online network to locate prospects, maintain a professional image, establish and maintain relationships, and/or engage with other individuals and organizations. Similarly, recruiters use the online network to search for candidates for job opportunities and/or open positions. At the same time, job seekers use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for managing the propagation of content in an online system. For example, the content includes articles, posts, updates, messages, discussions, customer support tickets, jobs, advertisements, and/or other content items created and/or transmitted by users of the online system. After a content item is submitted by a user to the online system, the content item is outputted or transmitted to a number of recipients, who are able to share, like, comment on, and/or otherwise interact with the content item. In turn, interaction with the content item allows the content item to be shown to additional recipients in the online system, thus propagating the content item across a network of users in the online system.

More specifically, the disclosed embodiments provide a method, apparatus, and system for unifying the moderation and analysis of the content in the online system. For example, content posted to the online system and user interactions with the content can be analyzed to identify and manage trends, topics, hashtags, sentiments, viral content, sensitive content, inappropriate content, misinformation, spam, brand-specific content, and/or other types or attributes of the content.

First, subsets of the content and/or interactions with the content are matched to content-based criteria and/or behavioral criteria in a set of user-defined and/or automatically generated rules. For example, the content-based criteria include keywords, regular expressions, topics, sentiments, content sources, and/or other attributes of the content. The behavioral criteria include attributes of users interacting with the content and/or actions performed by the users on the content. The criteria are selected by users (e.g., within a user interface) and/or automatically identified (e.g., by machine learning models and/or based on analysis of trends and/or virality in the content).

Next, content and/or interactions that match a given rule are aggregated into a number of insights. For example, machine learning models are applied to attributes of the content and/or interactions to generate scores representing classifications, predictions, and/or other types of inferences. Statistics are also, or instead, calculated from the content and/or interaction, and outliers associated with the statistics are determined. The scores, statistics, and/or outliers are used to determine trends in the content and the interactions, predictions associated with the content and the interactions, and/or recommendations for moderating the content and the interactions.

In turn, the rules and/or insights allow users to monitor and/or moderate the content and interactions in the online system. For example, insights related to content associated with various topics, themes, keywords, types of interactions, and/or users are displayed in a dashboard within a user interface. A user interacts with the user interface to filter, sort, browse, and/or search for content and/or interactions associated with particular rules, users, or other entities. Through a review module in the user interface, the user can seamlessly review and/or flag the content and/or interactions for spam, inappropriate content, misinformation, and/or other violations of the online system's content policy, laws, or regulations. In turn, content that is flagged is restricted or blocked within the online system to prevent misuse of the online system and/or other adverse effects. In another example, the user interacts with tables, charts, and/or other visualizations of trends or patterns associated with the content to identify opportunities for sales, marketing, advertising, user recommendations, and/or other use cases and/or generate or distribute content for these use cases.

By automatically identifying and aggregating content based on criteria in configurable and/or dynamically created rules, the disclosed embodiments allow the content to be analyzed for insights related to the substance, usage, and/or popularity of the content. The insights and/or content additionally allow human moderators to monitor and/or moderate the distribution of content within the online system in a unified manner, which improves the quality of content in the online system, access to relevant content by users of the online system, and/or the value of the online system to the users.

In contrast, conventional content moderation techniques require manual searching, browsing, filtering, and/or review of content by humans. These techniques are unable to detect all content and/or interactions to which content moderation policies apply, which causes inconsistencies in the moderation of the content and/or distribution of some undesirable or inappropriate content to users. In addition, computer systems involved in the content moderation are required to process a series of requests for the content from the humans. This processing incurs processor, memory, storage, network, input/output (I/O), and/or other overhead, which reduces the performance and/or available bandwidth on the computer systems. Consequently, the disclosed embodiments may improve computer systems, applications, user experiences, tools, and/or technologies related to distributing, analyzing, and/or moderating content.

Unified Moderation and Analysis of Content

Figure 1:
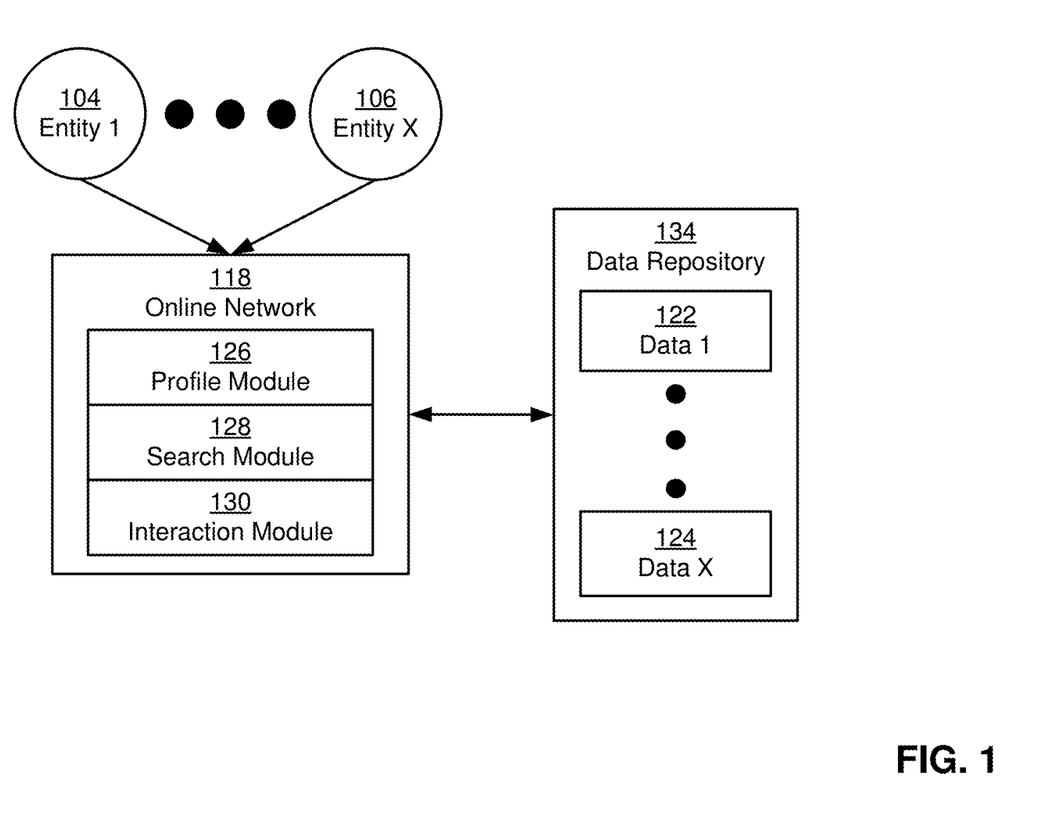
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Figure 2:
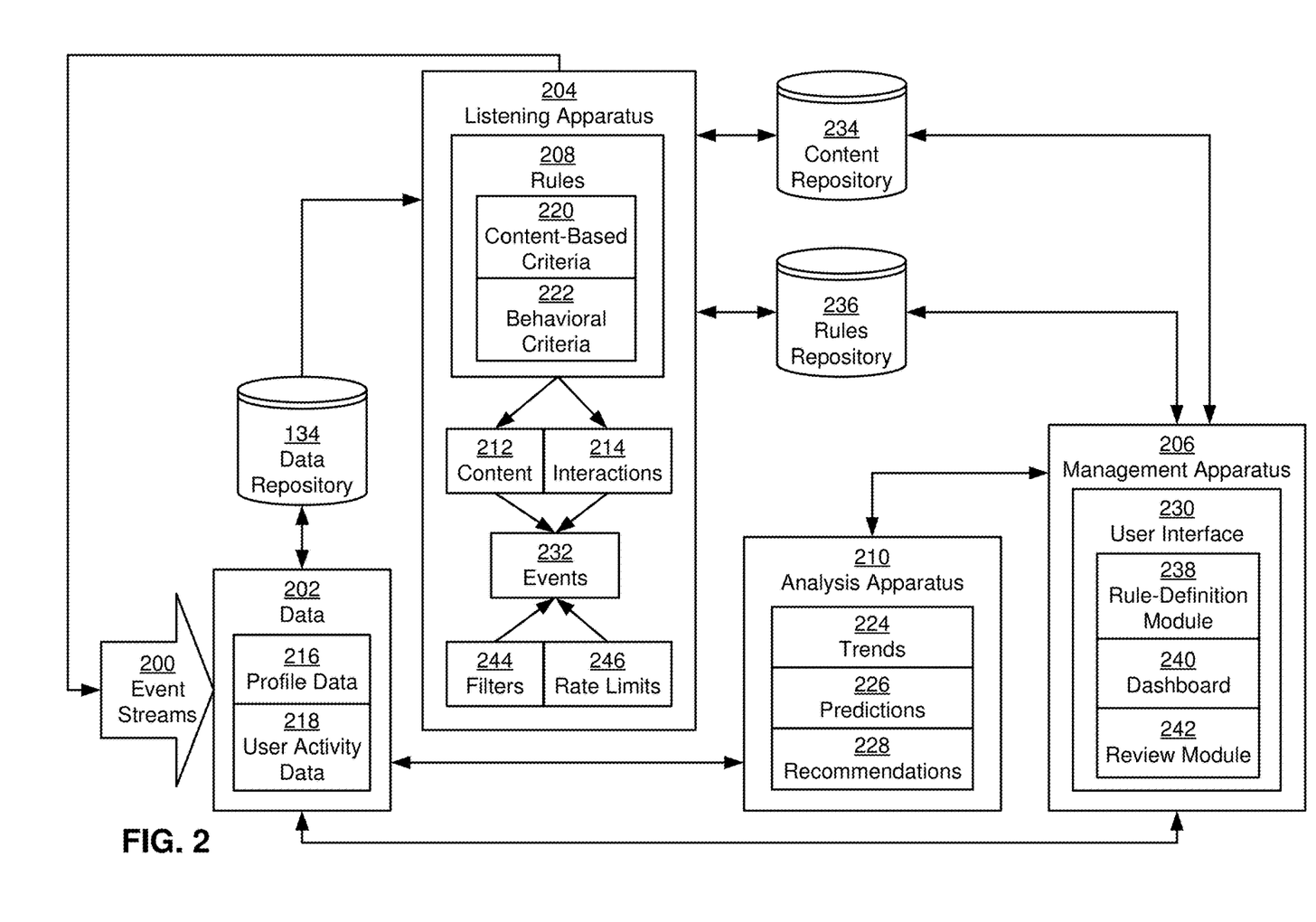
FIG. 2 shows a system for processing data in accordance with the disclosed embodiments.

As show in FIG. 2, data 202 from data repository includes profile data 216 for members of an online system (e.g., online network 118 of FIG. 1), as well as user activity data 218 that tracks the members' and/or candidates' activity within and/or outside the online system. Profile data 216 includes data associated with member profiles in the online system. For example, profile data 216 for an online professional network includes demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes of users of the online professional network. Profile data 216 may also include a set of groups to which each user belongs, the user's contacts and/or connections, awards or honors earned by the user, licenses or certifications attained by the user, patents or publications associated with the user, and/or other data related to the user's interaction with the platform.

Attributes of the members are optionally matched to a number of member segments, with each member segment containing a group of members that share one or more common attributes. For example, member segments in the platform may be defined to include members with the same industry, title, location, and/or language.

Connection information in profile data 216 is optionally combined into a graph, with nodes in the graph representing entities (e.g., users, schools, companies, locations, etc.) in the platform. Edges between the nodes in the graph represent relationships between the corresponding entities, such as connections between pairs of members, education of members at schools, employment of members at companies, following of a member or company by another member, business relationships and/or partnerships between organizations, and/or residence of members at locations.

User activity data 218 includes records of user interactions with one another and/or content associated with the online system. For example, user activity data 218 tracks impressions, clicks, likes, dislikes, shares, hides, comments, posts, updates, conversions, and/or other user interaction with content in the platform. User activity data 218 also, or instead, tracks other types of activity, including connections, messages, job applications, job searches, recruiter searches for candidates, interaction between candidates 116 and recruiters, and/or interaction with groups or events. In some embodiments, user activity data 218 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User activity data 218 additionally includes schedules, calendars, and/or upcoming availabilities of the users, which may be used to schedule meetings, interviews, and/or events for the users. Like profile data 216, user activity data 218 is optionally used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

In one or more embodiments, profile data 216, user activity data 218, and/or other data 202 in data repository 134 is standardized before the data is used by components of the system. For example, skills in profile data 216 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform. One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis.

In one or more embodiments, the system of FIG. 2 generates insights from content 212 published to the online system and interactions 214 between users of the online system and content 212. In some embodiments, content 212 includes articles, posts, images, audio, video, multimedia, documents, blogs, web pages, comments, designs, logos, papers, and/or other types of digital content shared by users of the online system (e.g., online network 118 of FIG. 1). After a given content item is posted, published, or otherwise shared by a user, the content item is stored in a content repository 234. The content item is also outputted or transmitted to a number of recipients, who are able to perform interactions 214 such as sharing, liking, disliking, upvoting, downvoting, hiding, reporting, and/or commenting on the content item. Such interactions 214 are tracked in user activity data 218 and/or other records in data repository 134. In turn, interactions 214 with the content item allow the content item to be shown to additional recipients in the online system, thus propagating the content item across a network of users in the online system.

As shown in FIG. 2, a listening apparatus 204 uses a set of rules 208 to identify content 212 and interactions 214 from which insights 210 are generated. Rules 208 include content-based criteria 220 that are matched to attributes of content 212 and/or behavioral criteria 222 that are matched to attributes of interactions 214. Content-based criteria 220 and behavioral-based criteria 222 can be specified by users and/or learned by machine learning models. For example, content-based criteria 220 include, but are not limited to, keywords, regular expressions, topics, sentiments, content sources (e.g., user posts, third-party articles, pages in the online system, comments, etc.), content visibilities (e.g., public, private, shared with connections, etc.), and/or types of content (e.g., text, audio, video, etc.). Similarly, behavioral criteria 222 include, but are not limited to, locations (e.g., cities, states, countries, regions, Internet Protocol (IP) addresses, etc.), user attributes (e.g., measures of user experience or quality, values in profile data 216, etc.), times, types of action (e.g., like, dislike, comment, share, hide, etc.), and/or counts of a type of action over a given period.

As a result, rules 208 can be created to monitor and/or flag certain types of content 212 and/or interactions 214. For example, one or more rules 208 include keywords, topics, and/or other content-based criteria 220 related to current events, potential sources of misinformation, and/or other areas of interest or potentially harmful activity. In another example, one or more rules 208 include identifiers, profile attributes, reputation scores, and/or other attributes of users posting and/or interacting with content 212. In a third example, each rule includes a start and/or end date (or time), so that the rule is used to identify content 212 or interactions 214 that generated after the start time and/or before the end time.

In some embodiments, rules 208 are specified by users interacting with a user interface 230 provided by a management apparatus 206. For example, user interface 230 includes a graphical user interface (GUI), web-based user interface, command line interface (CLI), voice user interface, and/or another type of user interface. User interface 230 is accessed by users that analyze and/or moderate content 212 and/or interactions 214 in the online system. User interface 230 includes a rule-definition module 238 that allows the users to define individual rules 208 containing content-based criteria 220 and/or behavioral criteria 222. For example, rule-definition module 238 includes checkboxes, radio buttons, drop-down menus, text fields, toggles, and/or other user-interface elements that are used by the users to specify parameters associated with rules 208. After a rule is defined and submitted by a user through rule-definition module 238, management apparatus 206 saves the rule in a rules repository 236 for subsequent retrieval and use by listening apparatus 204 and/or other components of the system.

One or more rules 208 are also, or instead, automatically generated based on analysis of content 212 in content repository 234 and/or interactions 214 in data repository 134. For example, listening apparatus 204 and/or another component use one or more machine learning models to generate and/or analyze statistics associated with content 212 and/or interactions 214 to detect trends, virality, popularity, and/or increased affinity for content 212 containing certain keywords or topics and/or content 212 from certain sources or users. The component also, or instead, uses machine learning and/or other techniques to identify trending keywords, topics, and/or other attributes in news articles, press releases, announcements, event calendars, and/or other content 212 outside the online system. The component then creates rules 208 containing the keywords, topics, sources, and/or users and stores rules 208 in rules repository 236.

After a rule is added to rules repository 236, listening apparatus 204 identifies content 212 and/or interactions 214 that match criteria in the rule. For example, listening apparatus 204 receives content 212 and interactions 214 with content 212 on a near-real-time basis (e.g., from events and/or records generated in response to submission of content 212 and/or user interactions 214 with content 212). Listening apparatus 204 applies filters representing content-based criteria 220 and/or behavioral criteria 222 in the rule to content 212 and interactions 214. When a content item published to the online system or edited after publication matches content-based criteria 220 in the rule, listening apparatus 204 generates an event that contains a record that identifies the content item, the rule, and/or attributes associated with the content item. When an interaction associated with the content item is subsequently received, the interaction is compared with any behavioral criteria 222 in the rule and/or another rule. If the interaction matches behavioral criteria 222, listening apparatus 204 generates an additional event containing a record that identifies the interaction, the content item, the rule, and/or additional attributes associated with the content item and/or interaction.

In turn, events 232 produced by listening apparatus 204 are transmitted in one or more event streams 200 for processing by other components of the system. As mentioned above, such events 232 include attributes of content 212 and interactions 214 in a format that can be consumed by downstream components in the system. For example, an event representing publishing of a content item to the online system includes an identifier (ID) for the content item, a copy of the content item, a location of the content item (e.g., in content repository 234), an ID of a user publishing the content item, the time at which the content item was published, the type of content item, a source of the content item (e.g., an external website, a group discussion, a thread, etc.), one or more rules to which the content item is matched, and/or other data or metadata. In another example, an event representing interaction with a content item in the online system includes the ID of the content item, the ID of the user performing the interaction, attributes of the user (e.g., scores representing the user's trustworthiness, reputation, engagement with the online system, etc.), the time of the interaction, the type of interaction, one or more rules to which the interaction is matched, and/or other data or metadata.

Listening apparatus 204 also, or instead, applies filters 244 and/or rate limits 246 to the generation of events 232 from content 212 and interactions 214 that match rules 208. In one or more embodiments, filters 244 and/or rate limits 246 are adapted to different use cases and/or consumers of events 232. For example, listening apparatus 204 enforces a per-rule rate limit for events 232. When the number of events 232 generated for a given rule reaches the rate limit over a given period (e.g., an hour, a day, etc.), listening apparatus 204 throttles and/or discontinues generation of subsequent events 232 for the same rule to prevent consumers of events 232 from being overloaded. Listening apparatus 204 optionally enforces an overall rate limit for all events 232 processed by the consumers.

In another example, listening apparatus 204 generates different types of events 232 for different consumers of events 232. These consumers include one or more instances of an analysis apparatus 210, which analyzes data in events 232 to generate insights related to the corresponding content 212 and/or interactions 214. These consumers also, or instead, include external partners that analyze content 212 and/or interactions 214 in the online system for branding, marketing, and/or other purposes. As a result, listening apparatus 204 enforces different rate limits 246 for different consumers of events 232 to accommodate differences in bandwidth of the consumers and/or to prevent external partners from deriving growth or usage metrics from events 232. Listening apparatus 204 also, or instead, applies a set of filters 244 that remove, encrypt, and/or obfuscate user IDs, content IDs, and/or other personally identifiable or sensitive information from fields in content 212 and/or interactions 214 prior to generating events 232 that contain the fields for subsequent consumption by the external partners.

In a third example, listening apparatus 204 calculates priority scores associated with content 212 based on interactions 214 with content 212. A content item has a higher priority score if the content item is associated with greater popularity and/or virality and a lower priority score if the content item is associated with lower popularity and/or virality. Listening apparatus 204 then orders events 232 representing content 212 in event streams 200 by descending priority score, so that more popular and/or viral content 212 is processed before less popular and/or viral content 212 by consumers of event streams 200. Listening apparatus 204 also, or instead, filters content 212 with priority scores that fall below a threshold from inclusion in event streams 200 to reduce processing of events 232 in event streams 200 by the consumers.

As mentioned above, analysis apparatus 210 generates insights related to content 212 and interactions 214 from events 232 produced by listening apparatus 204. In one or more embodiments, these insights include trends 224, predictions 226, and recommendations 228.

Trends 224 include changes over time in the publication of content 212 and/or interactions 214 with content 212 in the online system. For example, trends 224 include counts and/or other statistics associated with shares, likes, comments, and/or other activity related to content 212 that matches one or more rules 208. To determine trends 224, analysis apparatus 210 performs clustering and/or aggregating of content 212 and/or interactions 214 in events 232 by the attributes. In other words, trends 224 can be determined using descriptive analytics techniques that establish current and previous patterns of usage and/or interaction with content 212 in the online system.

Predictions 226 include inferences of current or future behavior and/or characteristics that cannot be determined using descriptive analytics. For example, predictions 226 include scores that measure the virality or popularity of content 212, based on interactions 214 associated with content 212. In another example, predictions 226 include topics, keywords, users, and/or other attributes that are likely to become viral (e.g., based on analysis of interactions 214 with content 212 containing the attributes over time). In a third example, predictions 226 classify certain pieces of content 212 as spam, inappropriate, misleading, suspicious, and/or otherwise flagged for review. In a fourth example, predictions 226 include sentiments, measures of bias, and/or other characteristics of content 212.

Recommendations 228 include prescriptive suggestions for moderating content 212 and/or interactions 214. For example, recommendations 228 include lists of content 212 for review by human moderators, such as content 212 associated with predictions 226 of being suspicious, spam, misleading, and/or otherwise inappropriate for the online system. As mentioned above, content 212 in the lists may be ordered by descending virality, popularity, and/or priority. In another example, recommendations 228 include hashtags, keywords, and/or other suggestions for targeting users of the online system with sales, marketing, advertising, and/or other types of campaigns or content 212.

After trends 224, predictions 226, recommendations 228, and/or other insights are generated, analysis apparatus 210 stores the insights in data repository 134 and/or another data store. Analysis apparatus 210 also, or instead, provides the insights to management apparatus 206 and/or another component of the system.

Management apparatus 206 receives trends 224, predictions 226, recommendations 228, and/or other insights from analysis apparatus 210, data repository 134, and/or another component. Next, management apparatus 206 outputs the insights in a dashboard 240 and/or review module 242 within user interface 230. For example, dashboard 240 allows administrators of the online system review visualizations of trends 224 and/or predictions 226. These visualizations include, but are not limited to, trend charts of statistics associated with content 212 and/or interactions 214, heat maps of geographic trends 224 (e.g., geographic regions color coded based on the occurrence of certain types of content 212 and/or interactions 214 with the content from people in those regions), and/or pie charts showing distributions of various attributes in users (e.g., user quality, user engagement with the online system, number of connections, attributes in profile data 216, etc.) that post or interact with content 212 that matches rules 208. In another example, review module 242 allows human moderators to review and/or perform corrective action related to content 212 and/or interactions 214, including blocking or restricting the distribution of certain types of content 212 and/or posting responses to content 212. User interfaces for moderating and analyzing content are described in further detail below with respect to FIGS. 3A-3C.

By automatically identifying and aggregating content 214 based on criteria in configurable and/or dynamically created rules 208, the system of FIG. 2 allows the content to be analyzed for insights related to the substance, usage, and/or popularity of the content. The insights and/or content 214 additionally allow human moderators to monitor and/or moderate the distribution of content 214 within the online system in a unified manner, which improves the quality of content 214, access to relevant content 214 by users of the online system, and/or the value of the online system to the users. Consequently, the disclosed embodiments may improve computer systems, applications, user experiences, tools, and/or technologies related to distributing, analyzing, and/or moderating content.

Those skilled in the art will appreciate that the system of FIG. 2 may be implemented in a variety of ways. First, listening apparatus 204, analysis apparatus 210, management apparatus 206, data repository 134, content repository 234, and/or rules repository 236 may be provided by a single physical machine, multiple computer systems, one or more virtual machines, a grid, one or more databases, one or more filesystems, and/or a cloud computing system. Listening apparatus 204, analysis apparatus 210, and management apparatus 206 may additionally be implemented together and/or separately by one or more hardware and/or software components and/or layers.

Second, a number of models and/or techniques may be used to generate trends 224, predictions 226, recommendations 228, and/or other output of the system. For example, insights generated by analysis apparatus 210 may be produced using regression models, artificial neural networks, support vector machines, decision trees, random forests, gradient boosted trees, naïve Bayes classifiers, Bayesian networks, clustering techniques, collaborative filtering techniques, deep learning models, hierarchical models, and/or ensemble models.

Figure 3A:
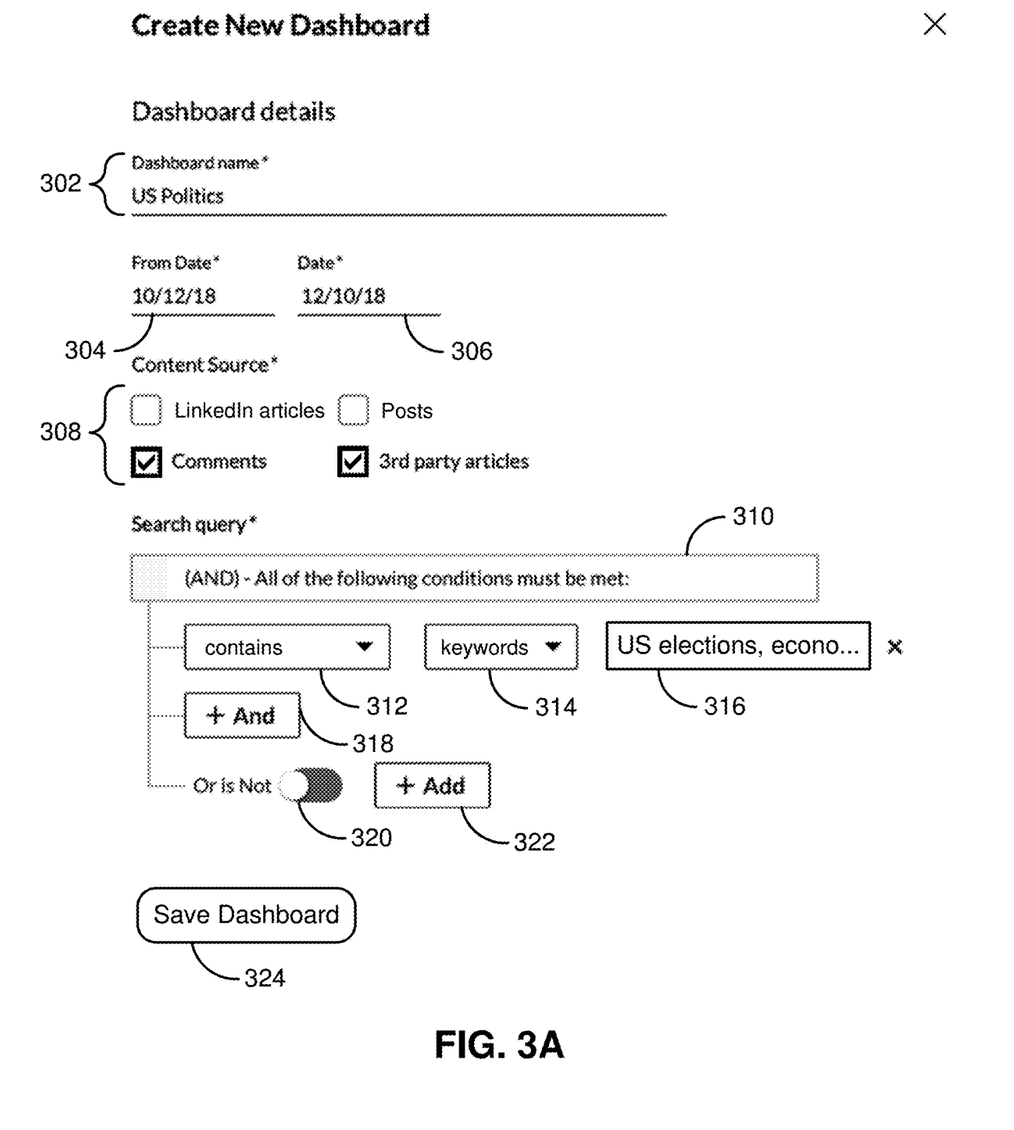
FIG. 3A shows an example screenshot in accordance with the disclosed embodiments.

FIG. 3A shows an example screenshot in accordance with the disclosed embodiments. More specifically, FIG. 3A shows a screenshot of a rule-definition module (e.g., rule-definition module 238 of FIG. 2) in a user interface for analyzing and moderating content (e.g., user interface 230 of FIG. 2). As shown in FIG. 3A, the rule-definition module includes a number of user-interface element 302-322 for creating a dashboard (e.g., dashboard 240 of FIG. 2) based on a rule that is matched to content and/or interactions in an online system.

User-interface elements 302-320 allow a user to specify criteria associated with the rule. Element 302 includes a text field for inputting a name of the dashboard (e.g., "US Politics"), and elements 304-306 include text fields, calendar elements, and/or other components that allow a user to specify a start date and an end date for content and/or interactions to which the rule applies. Element 308 includes a number of checkboxes that can be used to specify different sources of the content, such as articles published to the online system (e.g., "LinkedIn articles"), posts, comments, and/or third-party articles shared by users of the online system.

Elements 310-322 allow the user to define a search query that is used to retrieve content and/or interactions that match the rule. Element 310 is set to a logical conjunction (e.g., AND), disjunction (e.g., OR), or other type of logical operator between logical operands defined using elements 312-322.

Elements 312-316 define one logical operand in the query. In particular, element 312 includes a drop-down menu that allows a user to specify whether the content contains or does not contain subsequent components of the operand. Element 314 includes a drop-down menu that allows a user to specify that the operand applies to keywords, domains, members, topics, sentiments, and/or one or more other attributes of the content. Element 316 includes a text field and/or another component that allows a user to enter values of the attribute(s) selected in element 314. As shown in FIG. 3A, elements 312-316 are used by the user to define a set of keywords that appear in the content.

Element 318 can be used to define an additional operand in the query. For example, the user can click on element 318 to reveal an additional set of user-interface elements with the same structure as elements 312-316.

Elements 320-322 can be used to specify an additional condition associated with the query. The user can click on element 322 to reveal additional user-interface elements (not shown) for defining the condition. The user can also interact with a toggle provided by element 320 to indicate whether the content is or is not the condition.

Finally, element 324 allows the user to create the rule and corresponding dashboard using the criteria specified in elements 302-322. After the user clicks on element 324, the rule is saved and used to identify content matching the criteria, which allows the dashboard to be populated with insights related to the content and user interactions with the content.

Figure 3B:
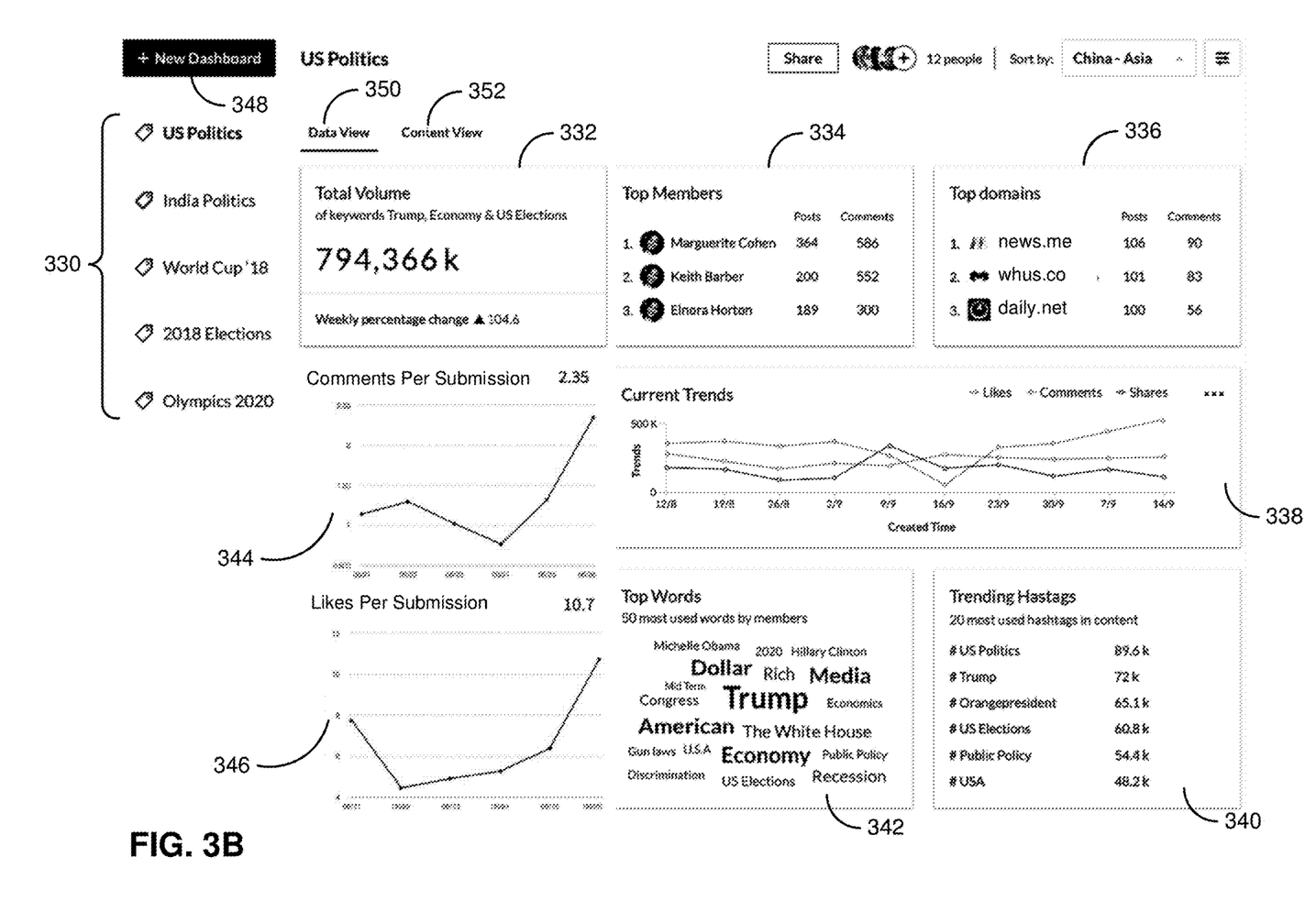
FIG. 3B shows an example screenshot in accordance with the disclosed embodiments.

FIG. 3B shows an example screenshot in accordance with the disclosed embodiments. More specifically, FIG. 3B shows a screenshot of a dashboard for analyzing and moderating content, such as dashboard 240 of FIG. 2. For example, the dashboard of FIG. 3B is generated in response to the rule created using the user interface of FIG. 3A. As a result, the dashboard includes a name of "US Politics" and shows insights related to content matching the criteria specified in elements 304-322.

As shown in FIG. 3B, the dashboard includes a number of user-interface elements 330-352 for navigating between screens of the user interface and/or accessing insights associated with the content. Element 330 includes a list of dashboards; a user can navigate to a different dashboard by clicking on the dashboard's name within the list. Element 348 includes a button that can be clicked by the user to access the user interface of FIG. 3A and create a new dashboard.

Elements 350-352 allow the user to switch between a "Data View" and a "Content View" provided by the dashboard. In the screenshot of FIG. 3B, "Data View" is underlined, indicating that remaining elements 332-346 in the user interface relate to visualizations or depictions of data (e.g., analytics) associated with the dashboard.

Element 332 shows aggregate statistics associated with content matching the criteria used to create the dashboard. In particular, element 332 includes a total volume of keywords specified in the criteria in content matching the rule, as well as a weekly percentage change in the total volume. Element 334 includes a list of top members contributing to the content, and element 336 includes a list of top domain names in which the content is posted. Element 338 shows a trend chart of likes, comments, and shares of the content over a preceding number of weeks, element 340 shows a list of the most frequently used hashtags in the content, and element 342 shows a word cloud of the most frequently used words in the content. Element 344 shows a trend chart of the number of comments per content submission over the last week, and element 346 shows a trend chart of the number of likes per content submission over the last week.

The user can click on and/or interact with elements 332-346 to view additional information associated with the corresponding visualizations and/or depictions. For example, clicking on element 332 results in the display of an overlay and/or another screen containing additional statistics associated with the volume of content and/or changes in the volume over time. Clicking on element 334 results in the display of an expanded list of top contributors to the content, and clicking on element 336 results in the display of an expanded list of top domain names from which the content is obtained. Clicking on an individual item in the lists shown in elements 334 and 336 results in the display of additional information related to the corresponding member and/or domain name, such as a list of posts and/or comments from the member and/or domain name.

Continuing with the above example, holding a cursor over different points in the trend charts of elements 338, 344, and 346 result in an overlay containing values of likes, comments, and/or shares associated with the points to be shown. Clicking on element 340 causes an expanded list of top hashtags to be shown, and clicking on a hashtag in element 340 results in the display of content that contains the hashtag and matches the rule. Finally, clicking on a word within the word cloud shown in element 342 results in the display of the word within corresponding pieces of content that match the rule.

Figure 3C:
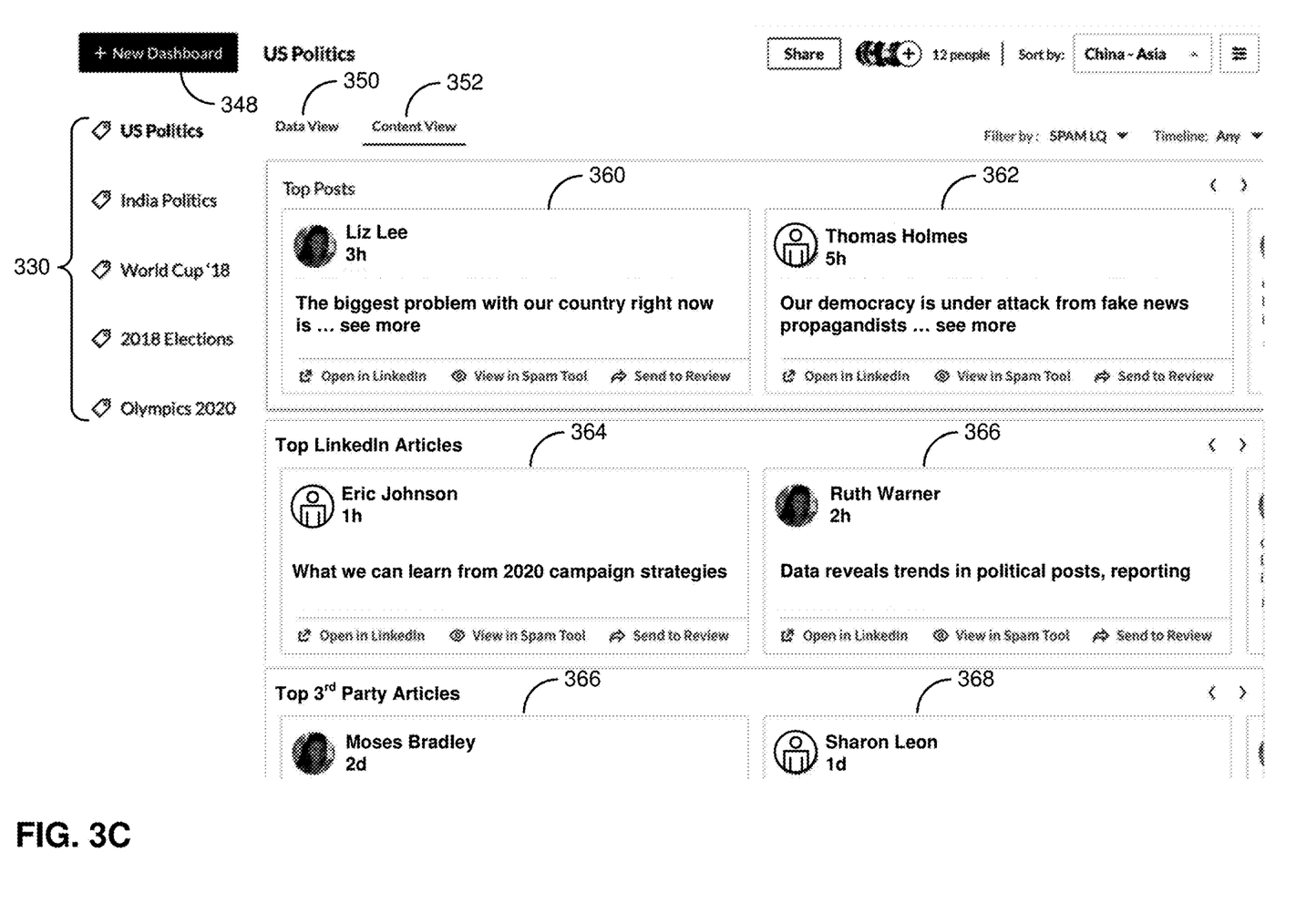
FIG. 3C shows an example screenshot in accordance with the disclosed embodiments.

FIG. 3C shows an example screenshot in accordance with the disclosed embodiments. More specifically, FIG. 3C shows the user interface of FIG. 3B after element 352 is selected, resulting in a switch from the "Data View" to the "Content View" in the dashboard.

The user interface of FIG. 3C includes three horizontal lists of different types of content that match the criteria of the dashboard. The first list includes two elements 360-362 representing top posts that match the criteria. The second list includes two elements 364-366 representing top articles published within the online system that match the criteria. The third list includes two elements 366-368 representing top third-party articles that match the criteria and are shared within the online system. To view additional elements (not shown) in each list, the user can scroll horizontally across the list using arrows on the top right corner of the list.

The user can interact with elements 360-368 of each of the lists to view additional information and/or apply actions related to the corresponding content. For example, the user can click on the name of a user in each element to view the user's profile in the online system. The user can click on a preview of the content underneath each user's name to view the entirety of the content. At the bottom of each element 360-368, the user can click a first section (e.g., "Open in LinkedIn") to view the corresponding content as shown within the online system, a second section (e.g., "View in Spam Tool") to access a tool that manages potential spam activity in the content, and a third section (e.g., "Send to Review") that flags the content for additional review. As a result, links at the bottom of elements 360-368 can be used by humans to block, respond to, and/or otherwise moderate the content.

Figure 4:
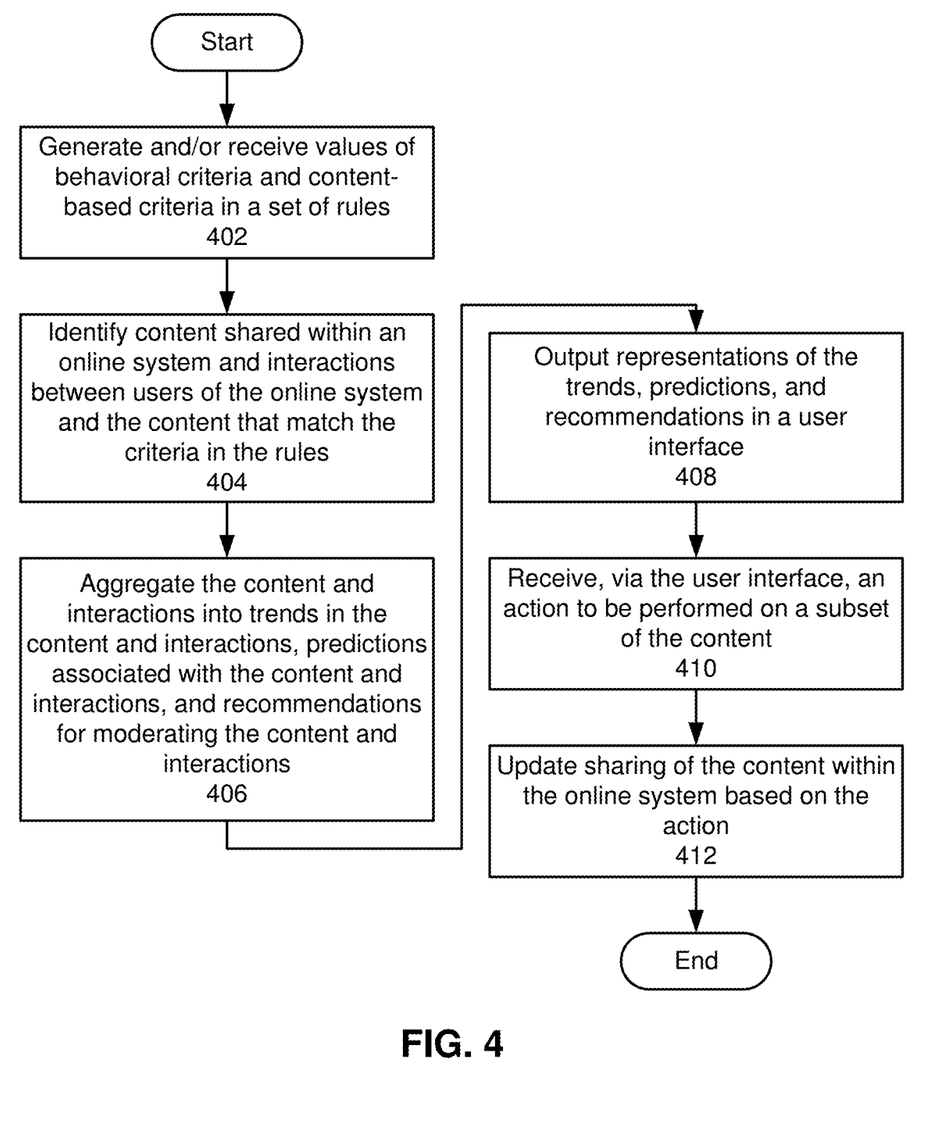
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, values of behavioral criteria and content-based criteria in a set of rules are generated and/or received (operation 402). For example, a first subset of the rules is specified by users through a user interface, and a second subset of the rules is automatically generated based on analysis of trends associated with the content and/or external sources of data. The behavioral criteria include, but are not limited to, a location, user, score associated with the user, time, type of action, and/or count of the action associated with a given content item or interaction. The content-based criteria include, but are not limited to, one or more keywords, regular expressions, topics, sentiments, priorities, content sources, visibilities (e.g., public, private, visible to connections, etc.), and/or types of content.

Next, content shared within an online system and interactions between users of the online system and the content that match the criteria in the rules are identified (operation 404). For example, when a content item published in the online system matches a rule, an event that identifies the rule and contains a record of the published content item is outputted to one or more event streams. When an interaction between a user and the content item matches the same rule and/or another rule, another event that identifies the rule(s) and contains a record of the interaction is outputted to the same event streams and/or different event streams. To prevent overloading of consumers of the event streams, rate limits are applied to transmission of the events on a per-rule and/or per-consumer basis.

The content and interactions are aggregated into trends in the content and interactions, predictions associated with the content and interactions, and recommendations for moderating the content and interactions (operation 406). Continuing with the above example, the events are transmitted to one or more consumers of the event streams, which perform the aggregation and/or analysis of the content and interactions. The consumers apply one or more machine learning models to the content and the interactions to generate scores representing the quality of the content and/or the "appropriateness" of posts and/or interactions related to the content. The consumers also, or instead, calculate statistics associated with the content and interactions, such as means, medians, standard deviations, total counts, and/or changes over time for various types of interactions with the content. The consumers also, or instead, determine outliers associated with the statistics (e.g., as potentially inappropriate or unusual behavior in the online system). The consumers also, or instead, obtain and/or calculate priority scores that reflect the virality and/or popularity of the corresponding content and generate recommendations for moderating and/or reviewing the content based on the priority scores (e.g., so that more popular or viral content is reviewed before less popular or viral content).

Representations of the trends, predictions, and recommendations are then outputted in a user interface (operation 408). For example, visualizations of the trends and/or predictions are displayed in the user interface. The visualizations include, but are not limited to, a table of popular content and statistics (e.g., counts of views, clicks, likes, comments, shares, etc.) associated with the popular content, a trend chart of the statistics, a heat map of geographic trends associated with the content and interactions (e.g., color-coded countries that reflect the amount of content shared from those countries), a distribution of user attributes (e.g., user engagement, user quality, number of connections, profile attributes, etc.) associated with the content and interactions, a list of top users and/or domains associated with a given set of content, and/or top words or hashtags associated with the content. In another example, a subset of content produced by a user is shown in conjunction with profile data for the user to allow a moderator to assess the content in the context of the user's background or other attributes. In a third example, a subset of content is displayed for review within the user interface (e.g., for spam, malicious activity, misinformation, and/or other violations of the online system's content policy).

Finally, an action to be performed on a subset of the content is received via the user interface (operation 410), and sharing of the content within the online system is updated based on the action (operation 412). For example, the action includes restricting or blocking distribution of one or more posts, articles, comments, and/or other content items flagged as inappropriate via the user interface. In another example, the action includes posting a response to a content item within the online system.

Figure 5:
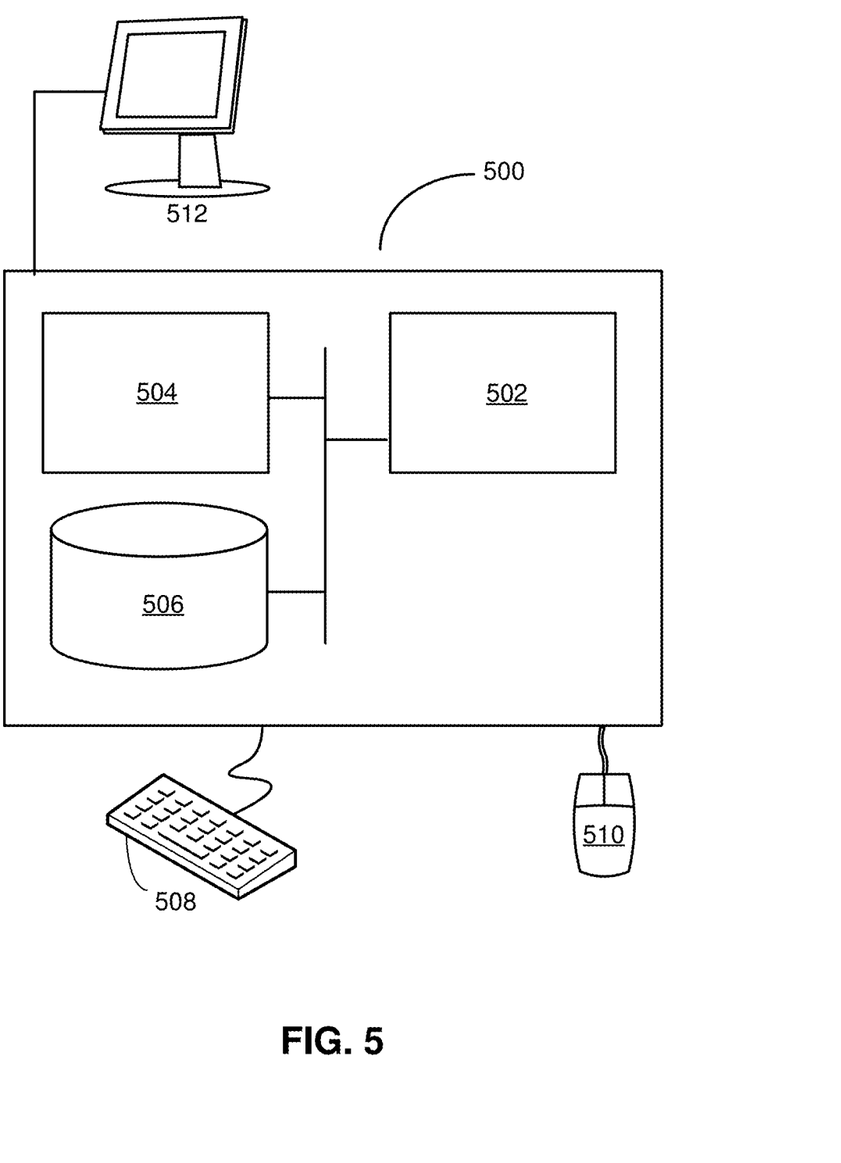
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 also includes input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for processing data. The system includes a listening apparatus, an analysis apparatus, and a management apparatus, one or more of which may alternatively be termed or implemented as a module, mechanism, or other type of system component. The listening apparatus identifies content shared within an online system and interactions between users of the online system and the content that match behavioral criteria and content-based criteria in a set of rules. Next, the analysis apparatus aggregates the content and the interactions into trends in the content and the interactions, predictions associated with the content and the interactions, and recommendations for moderating the content and the interactions. The management apparatus then outputs representations of the trends, the predictions, and the recommendations in a user interface. Finally, the management apparatus receives, via the user interface, an action to be performed on a subset of the content and updates sharing of the content within the online system based on the action.

In addition, one or more components of computer system 500 may be remotely located and connected to the other components over a network. Portions of the present embodiments (e.g., listening apparatus, analysis apparatus, management apparatus, data repository, rules repository, content repository, online network, etc.) may also be located on different nodes of a distributed system that implements the embodiments. For example, the present embodiments may be implemented using a cloud computing system that analyzes and/or moderates content and/or interactions between a set of remote users and the content.

By configuring privacy controls or settings as they desire, members of a social network, a professional network, or other user commur that may use or interact with embodiments described herein can control or restrict the information that is collected from them, the information that is provided to them, their interactions with such information and with other members, and/or how such information is used. Implementation of these embodiments is not intended to supersede or interfere h the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
   receiving a set of rules, each rule in the set of rules specifying a value for behavioral criteria and a value for content-based criteria;
   identifying, by one or more computer systems, content submitted by a user and shared within an online system and interactions between multiple users of the online system;
   determining the content matches a value for a behavioral criterion and a value for a content-based criterion, as specified in a rule in the set of rules;
   generating by the one or more computer systems:
      (i) a trend with content and interactions of multiple users of the online system by clustering interaction with the content,
      (ii) a predication associated with the content and the interactions, and
      (iii) a recommendation of an action for moderating a subset of the content;
   outputting, to a user interface by the one or more computer systems, the generated trend, predication, and recommendation;
   receiving, via the user interface, a selection of the action for moderating a subset of the content to be performed on a subset of the content; and
   executing a set of instructions to perform the action on the subset of the content to update the content submitted by the user within the online system.

2. The method of claim 1, further comprising:
   generating additional values of the behavioral criteria and the content-based criteria for a second subset of the rules based on additional analysis of the content and the interactions using a machine learning model.

3. The method of claim 1, wherein identifying the content and the interactions that match the behavioral criteria and the content-based criteria in the set of rules comprises:
   when a content item published in the online system matches a first rule, outputting a first event comprising a first record of the published content item to one or more event streams; and
   when an interaction between a user and the content item matches a second rule, outputting a second event comprising a second record of the interaction to the one or more event streams.

4. The method of claim 3, wherein identifying the content and the interactions that match the behavioral criteria and the content-based criteria in the set of rules further comprises:
   applying a first rate limit to transmission of events associated with the first and second rules to a first consumer of the one or more event streams; and
   applying a second rate limit to the transmission of the events to a second consumer of the one or more event streams.

5. The method of claim 1, wherein generating the trends, the predictions, and the recommendations comprises:
   calculating, based on the interactions, a first priority score for a first subset of the content that matches a first rule and a second priority score for a second subset of the content that matches the second rule; and
   generating the recommendations for moderating the first and second subsets of the content based on the first and second priority scores.

6. The method of claim 1, wherein generating the trends, the predictions, and the recommendations comprises at least one of:
applying one or more machine learning models to the content and the interactions;
calculating statistics associated with the content and the interactions; and
determining outliers associated with the statistics.

7. The method of claim 1, wherein outputting the trends, the predictions, and the recommendations in the user interface comprises:
displaying one or more visualizations of the trends in the user interface.

8. The method of claim 7, wherein the one or more visualizations comprise at least one of:
a table comprising popular content and statistics associated with the popular content;
a trend chart of the statistics;
a heat map of geographic trends associated with the content and the interactions; and
a distribution of user attributes associated with the content and the interactions.

9. The method of claim 1, wherein outputting the trends, the predictions, and the recommendations in the user interface comprises at least one of:
displaying the subset of the content produced by a user in conjunction with profile data for the user; and
displaying the subset of the content for review within the user interface.

10. The method of claim 1, wherein the behavioral criteria comprise at least one of:
a location;
a user;
a score associated with the user;
a time;
a type of action; and
a count of the action.

11. The method of claim 1, wherein the content-based criteria comprise at least one of:
a keyword;
a regular expression;
a topic;
a sentiment;
a priority;
a content source;
a visibility; and
a type of content.

12. The method of claim 1, wherein the action comprises at least one of:
restricting distribution of the subset of the content; and
responding to the subset of the content.

13. A system, comprising:
one or more processors; and
memory storing instructions that, when executed by the one or more processors, cause the system to:
receiving a set of rules, each rule in the set of rules specifying a value for behavioral criteria and a value for content-based criteria;
identify content, submitted by a user, shared within an online system and interactions between multiple users of the online system;
determine the content matches at least one value for the behavioral criterion and a value for a content-based criterion, as specified in a rule in the set of rules;
generate at least one of:
(i) a trend with the content and the interactions of multiple users by clustering interaction with the content,
(ii) a prediction associated with the content and the interactions, and
(iii) a recommendation of an action for moderating a subset of the content;
output, to a user interface, the generated trend, prediction, and recommendation trends and predictions;
receive, via the user interface, a selection of the action for moderating a subset of the content to be performed on a subset of the content; and
executing a set of instructions to perform the action on the subset of the content to update the content submitted by the user within the online system.

14. The system of claim 13, wherein the memory further stores instructions that, when executed by the one or more processors, cause the system to:
generate additional values of the behavioral criteria and the content-based criteria for a second subset of the rules based on additional analysis of the content and the interactions using a machine learning model.

15. The system of claim 13, wherein generating the trends, the predictions, and the recommendations comprises:
calculating, based on the interactions, a first priority score for a first subset of the content that matches a first rule and a second priority score for a second subset of the content that matches the second rule; and
generating the recommendations for moderating the first and second subsets of the content based on the first and second priority scores.

16. The system of claim 13, wherein generating the trends, the predictions, and the recommendations comprises at least one of:
applying one or more machine learning models to the content and the interactions;
calculating statistics associated with the content and the interactions; and
determining outliers associated with the statistics.

17. The system of claim 13, wherein outputting the trends, the predictions, and the recommendations in the user interface comprises:
displaying one or more visualizations of the trends in the user interface.

18. The system of claim 17, wherein the one or more visualizations comprise at least one of:
a table comprising popular content and statistics associated with the popular content;
a trend chart of the statistics;
a heat map of geographic trends associated with the content and the interactions; and
a distribution of user attributes associated with the content and the interactions.

19. The system of claim 13, wherein outputting the trends, the predictions, and the recommendations in the user interface comprises at least one of:
displaying the subset of the content produced by a user in conjunction with profile data for the user; and
displaying the subset of the content for review within the user interface.

20. A non-transitory computer-readable storage medium storing instructions that when executed by a computer cause the computer to perform a method, the method comprising:
receiving a set of rules, each rule in the set of rules specifying a value for behavioral criteria and a value for content-based criteria;

identifying content, submitted by a user, shared within an online system and interactions between multiple users of the online system;
determining the content matches a value for a behavioral criterion and a value of a content-based criterion, as specified in a rule in the set of rules;
generating:
   (i) a trend with content and interactions of multiple users of the online system by clustering interaction with the content,
   (ii) a prediction associated with the content and the interactions, and
   (iii) a recommendation of an action for moderating a subset the content and the interactions;
outputting, to a user interface, the generated trend, prediction, and recommendation;
receiving, via the user interface, a selection of the action for moderating a subset of the content to be performed on a subset of the content; and
executing a set of instructions to perform the action on the subset of the content to update the content submitted by the user within the online system.

* * * * *

UNITED STATES PATENT AND TRADEMARK OFFICE
CERTIFICATE OF CORRECTION

| | | |
|---|---|---|
| PATENT NO. | : 11,494,670 B2 | Page 1 of 1 |
| APPLICATION NO. | : 16/822267 | |
| DATED | : November 8, 2022 | |
| INVENTOR(S) | : Joshi et al. | |

It is certified that error appears in the above-identified patent and that said Letters Patent is hereby corrected as shown below:

In the Claims

In Column 19, Line 14, in Claim 20, after "subset", insert --of--

Signed and Sealed this
Seventeenth Day of January, 2023

Katherine Kelly Vidal
*Director of the United States Patent and Trademark Office*